US008081323B2

(12) United States Patent
Nishikawa

(10) Patent No.: US 8,081,323 B2
(45) Date of Patent: Dec. 20, 2011

(54) APPARATUS AND METHOD FOR TRANSFERRING DATA TO REMOTE PRINTER

(75) Inventor: Naoyuki Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1038 days.

(21) Appl. No.: 10/766,677

(22) Filed: Jan. 27, 2004

(65) Prior Publication Data

US 2004/0194013 A1   Sep. 30, 2004

(30) Foreign Application Priority Data

Jan. 31, 2003   (JP) ................................. 2003-024790
Jan. 31, 2003   (JP) ................................. 2003-024791
Jan. 31, 2003   (JP) ................................. 2003-024792

(51) Int. Cl.
*G06F 17/21* (2006.01)
(52) U.S. Cl. ...................... 358/1.13; 358/1.15
(58) Field of Classification Search .................. 715/500;
358/406, 404, 408, 296, 1.15, 1.14, 1.16,
358/402, 1.11, 1.13; 714/18; 705/51; 395/586,
395/112
See application file for complete search history.

(56) References Cited

U.S. PATENT DOCUMENTS

| | | | | |
|---|---|---|---|---|
| 5,220,674 A * | 6/1993 | Morgan et al. | ................ | 709/223 |
| 5,287,194 A * | 2/1994 | Lobiondo | ..................... | 358/296 |
| 5,550,957 A * | 8/1996 | Davidson et al. | ........... | 358/1.15 |
| 5,625,757 A * | 4/1997 | Kageyama et al. | .......... | 358/1.14 |
| 5,799,206 A * | 8/1998 | Kitagawa et al. | .............. | 710/36 |
| 5,940,186 A * | 8/1999 | Barry et al. | ................... | 358/296 |
| 6,020,973 A * | 2/2000 | Levine et al. | ................ | 358/1.15 |
| 6,115,132 A * | 9/2000 | Nakatsuma et al. | ......... | 358/1.14 |
| 6,148,346 A * | 11/2000 | Hanson | ......................... | 719/321 |
| 6,401,150 B1 * | 6/2002 | Reilly | ........................... | 710/104 |
| 6,665,086 B2 * | 12/2003 | Hull et al. | ..................... | 358/1.15 |
| 6,665,724 B2 * | 12/2003 | Lawrence | ..................... | 709/230 |
| 6,897,974 B1 * | 5/2005 | Coker | ........................... | 358/1.15 |
| 7,054,020 B2 * | 5/2006 | Gassho et al. | ............... | 358/1.15 |
| 7,170,639 B1 * | 1/2007 | Dittrich et al. | ............... | 358/3.01 |
| 7,242,498 B2 * | 7/2007 | Fujiwara | ...................... | 358/1.16 |
| 2002/0078160 A1 * | 6/2002 | Kemp et al. | .................... | 709/208 |
| 2002/0080391 A1 * | 6/2002 | Sugiura et al. | ............... | 358/1.15 |
| 2002/0083001 A1 * | 6/2002 | Ogishima | ........................ | 705/51 |
| 2002/0089692 A1 * | 7/2002 | Ferlitsch | ....................... | 358/1.15 |
| 2002/0109861 A1 * | 8/2002 | LeClair et al. | ................ | 358/1.15 |
| 2002/0135797 A1 * | 9/2002 | Al-Kazily et al. | ............. | 358/1.15 |
| 2003/0018829 A1 * | 1/2003 | Carney et al. | .................. | 709/321 |
| 2003/0030843 A1 * | 2/2003 | Qiao | ............................ | 358/1.15 |
| 2003/0076519 A1 * | 4/2003 | Kadota | .......................... | 358/1.11 |
| 2003/0206312 A1 * | 11/2003 | McAfee et al. | ............... | 358/1.15 |
| 2003/0218767 A1 * | 11/2003 | Schroath et al. | ............. | 358/1.14 |
| 2004/0095595 A1 * | 5/2004 | Jacobsen | ....................... | 358/1.14 |
| 2004/0137919 A1 * | 7/2004 | Biundo | .......................... | 455/466 |
| 2004/0141189 A1 * | 7/2004 | Dittrich et al. | ................. | 358/1.2 |

* cited by examiner

*Primary Examiner* — King Poon
*Assistant Examiner* — Allen H Nguyen
(74) *Attorney, Agent, or Firm* — Cowan, Liebowitz & Latman, P.C.

(57) ABSTRACT

Using a print response process block for generating a print job, a spool process block for spooling the print job and generating a print completion job, a transferring data convert process block for converting the print completion job into a format in which the print completion job can be transferred to a remote printer, a remote transfer process block for transferring the print completion job according to a predetermined transfer protocol, and an encipher block for enciphering the print completion job, a print process for performing remote printing is temporarily completed in a local network to suppress a delay in communications when remote printing is performed, a disconnection of a connected circuit, and a data leak during the remote transfer.

9 Claims, 10 Drawing Sheets

APPARATUS AND METHOD FOR TRANSFERRING DATA TO REMOTE PRINTER

BACKGROUND OF THE INVENTION

1. Field of the Invention

The present invention relates to a data processing apparatus, and more specifically to a data processing apparatus suitably used for an image processing system for performing a color matching process based on a color profile.

2. Related Background Art

Conventionally, a remote printing operation over a network has been widely used. For example, in a connection style of a horizontal distribution type network as shown in FIG. 10, a client PC (personal computer) 900 can be connected to a first printer server 910 using a LAN 950, etc. in the same segment.

Furthermore, when a TCP/IP is used as a network protocol, print data can be sent from the client PC 900 to the first printer server 910 using a print control protocol such as an LPR (line printer daemon protocol).

Additionally, as shown in FIG. 10, printer servers outside the same segment such as a second printer server 920, a third printer server 930, etc. can be accessible through a first router 960 and a second router 970, thereby enabling a print process by sending print data as described above.

Recently, a large amount of color images can be processed, and the amount of print data at sending has exceedingly increased. In this situation, there have been some problems unsolved in the remote printing system over the conventional network.

Among all, with an increasing amount of data, it has been very difficult to stably and correctly transfer data without delay or, at worst, disconnection during the communications.

Furthermore, in a globally connected network infrastructure, a very large amount of various data can be simultaneously sent. As a result, various problems such as line congestion, etc. have occurred when data communications temporarily enter a congestion state, etc.

Under the circumstances, there is an important problem to successfully establish a method of remotely printing color graphic print data to be used in a high-end market with ease and stability. There is also the possibility that color print data can be leaked to the third party when the color data is remotely transferred.

SUMMARY OF THE INVENTION

The present invention aims at remotely printing color data, etc. with ease and stability.

The present invention also aims at preventing print data to be remotely transferred from being leaked to the third party.

According to one aspect, the present invention which achieves these objectives relates to a data processing apparatus for sending data over a network and printing the data on a remote printer, including: print response means for generating a print job for performing a response process when the data is printed; spooling means for generating a print completion job by spooling print job generated by the print response means; transferring data conversion means for converting the print completion job generated by the spooling means into a format in which the job can be transferred to the remote printer over the network; and remote transfer means for transferring the print completion job converted into a transferrable format by the transferring data conversion means using a predetermined transfer protocol.

According to another aspect, the present invention which achieves these objectives relates to a data processing method for sending data over a network, and printing the data on a remote printer, including: a print response step of generating a print job for performing a response process when the data is printed; a spooling step of generating a print completion job by spooling print job generated in the print response step; a transferring data conversion step of converting the print completion job generated in the spooling step into a format in which the job can be transferred to the remote printer over the network; and a remote transfer step of transferring the print completion job converted into a transferrable format in the transferring data conversion step using a predetermined transfer protocol.

According to still another aspect, the present invention which achieves these objectives relates to a program used to direct a computer to use a method for sending data over a network and printing the data on a remote printer, including: a print response step of generating a print job for performing a response process when the data is printed; a spooling step of generating a print completion job by spooling print job generated in the print response step; a transferring data conversion step of converting the print completion job generated in the spooling step into a format in which the job can be transferred to the remote printer over the network; and a remote transfer step of transferring the print completion job converted into a transferrable format in the transferring data conversion step using a predetermined transfer protocol.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

A preferred embodiment of the present invention is described below in detail by referring to the attached drawings.

<Outline of Remote Printing System>

Figure 9:
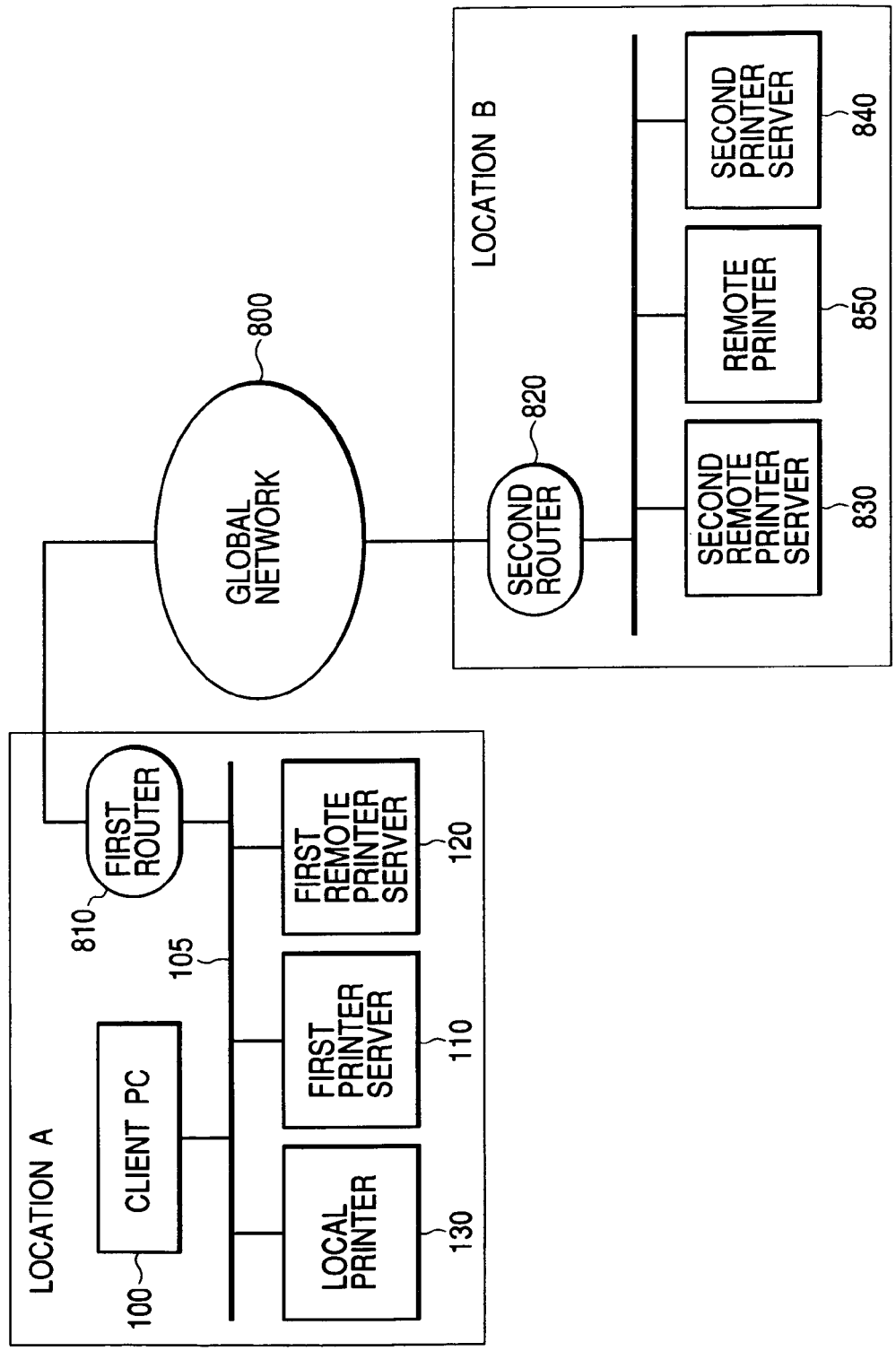
FIG. 9 is an explanatory view of the outline of the remote printing system to which the color data processing apparatus is applied.
Figure 10:
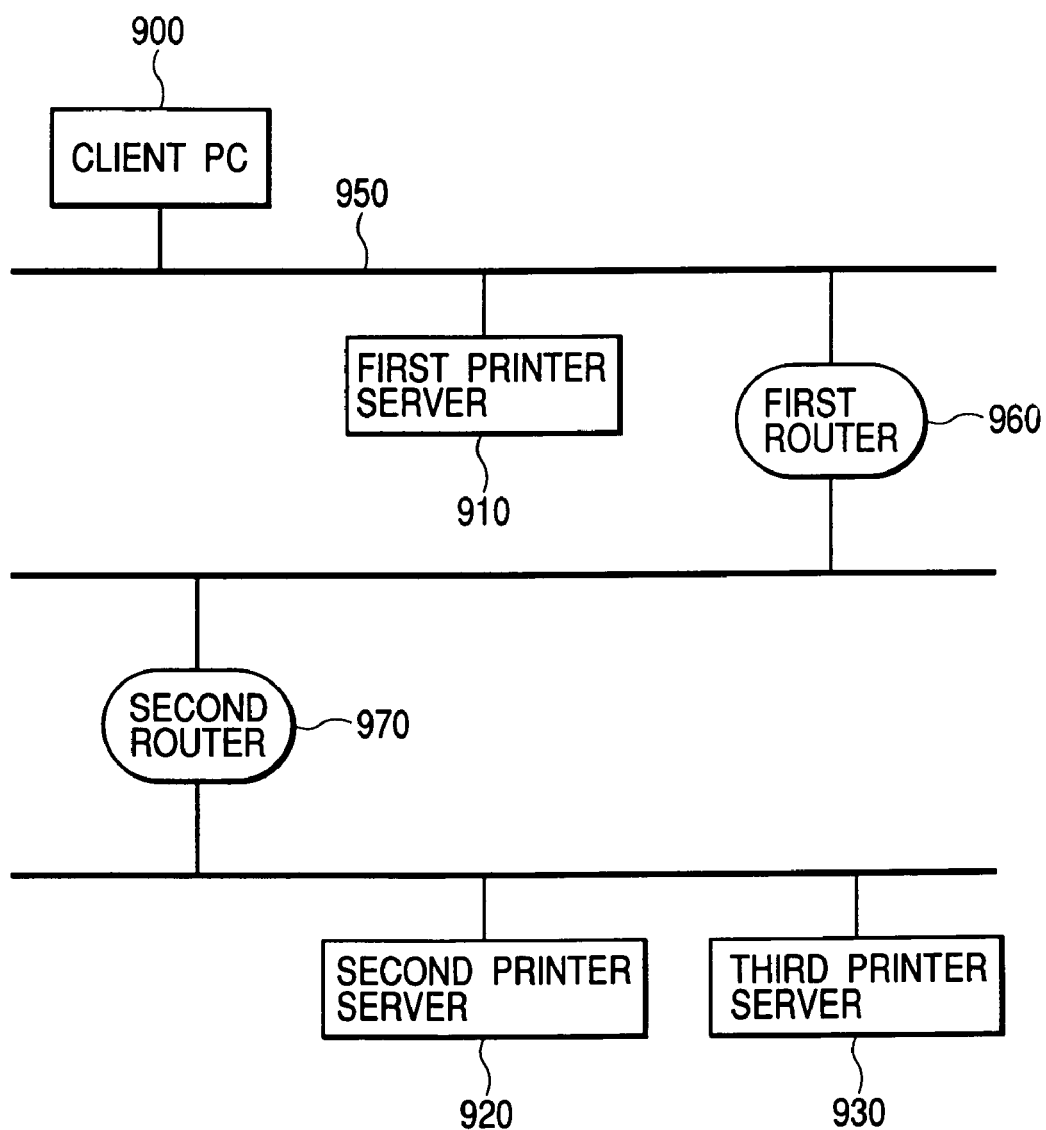
FIG. 10 shows an example of a connection system in a horizontal distribution type network.

First, the outline of the remote printing system to which the color data processing apparatus according to the present embodiment is applied is described by referring to FIG. 9.

As shown in FIG. 9, in the remote printing system, a first location A is configured by a client PC 100, a first printer server 110, a first remote printing server 120, a local printer 130, a local network 105, a first router 810.

A second location B is configured by a second router 820, a second remote printing server 830, a second printer server 840, a remote printer 850, etc. The first location A is connected to the second location B through a global network 800, thereby forming a remote printing system.

The first remote printing server 120 is a device forming part of the color data processing apparatus according to the present embodiment, and is configured such that a print process can be locally and temporarily completed by performing a print response process with the client PC 100. Then, a job spool process is performed, a print completion job is converted into a internally transferrable format, and a transfer process is performed using a transfer protocol. Furthermore, a recovery process is performed as necessary.

That is, when the first remote printing server 120 is viewed from the client PC 100, it is recognized as a network printer like a normal local printer 130 because the print control protocol is executed such that the remote printing server 120 can be recognized as the local printer 130 on the network 105. The protocol is processed by the internal print response process block described later.

When the client PC 100 performs the print process for the remote printing server 120, the session start process starts as in the normal print process, and a series of communications including a print start command, sending and receiving a print status response, sending print data, a check of sending status, a print end command, session completion, etc. is performed in accordance with a predetermined print protocol.

When print data is sent to the remote printing server 120, the first remote printing server 120 performs a data hold process in the spool process block described later to internally hold the data. Data can be appropriately held in the spooling area of the disk device on the first remote printing server 120.

The data held in the spooling area is converted in data format by the transferring data convert process block for remote transfer. According to the present embodiment, a mail sending and receiving protocol and a file transfer protocol are used for the remote transfer.

When the mail sending and receiving protocol is selected, spooled data group is encoded into 7-bit characters by the transferring data convert process block, a header file, etc. is added thereto, and the data is converted into a mail data format. It is also possible to perform an encipher process on the encoded mail format. The encoded mail data can be enciphered and then sent.

In the remote transfer process block, the converted data is appropriately sent over a network. When the FTP is selected for the remote transfer, the data is not converted, and the spooled data is transferred in binary directly to the receiving server. Although the FTP is used, the encipher process can be performed. The recovery function block is called as necessary at remote transfer, data is sent, received, etc. again so that the data can be sent without fail.

Described below is an embodiment of the data processing apparatus.

Figure 1:
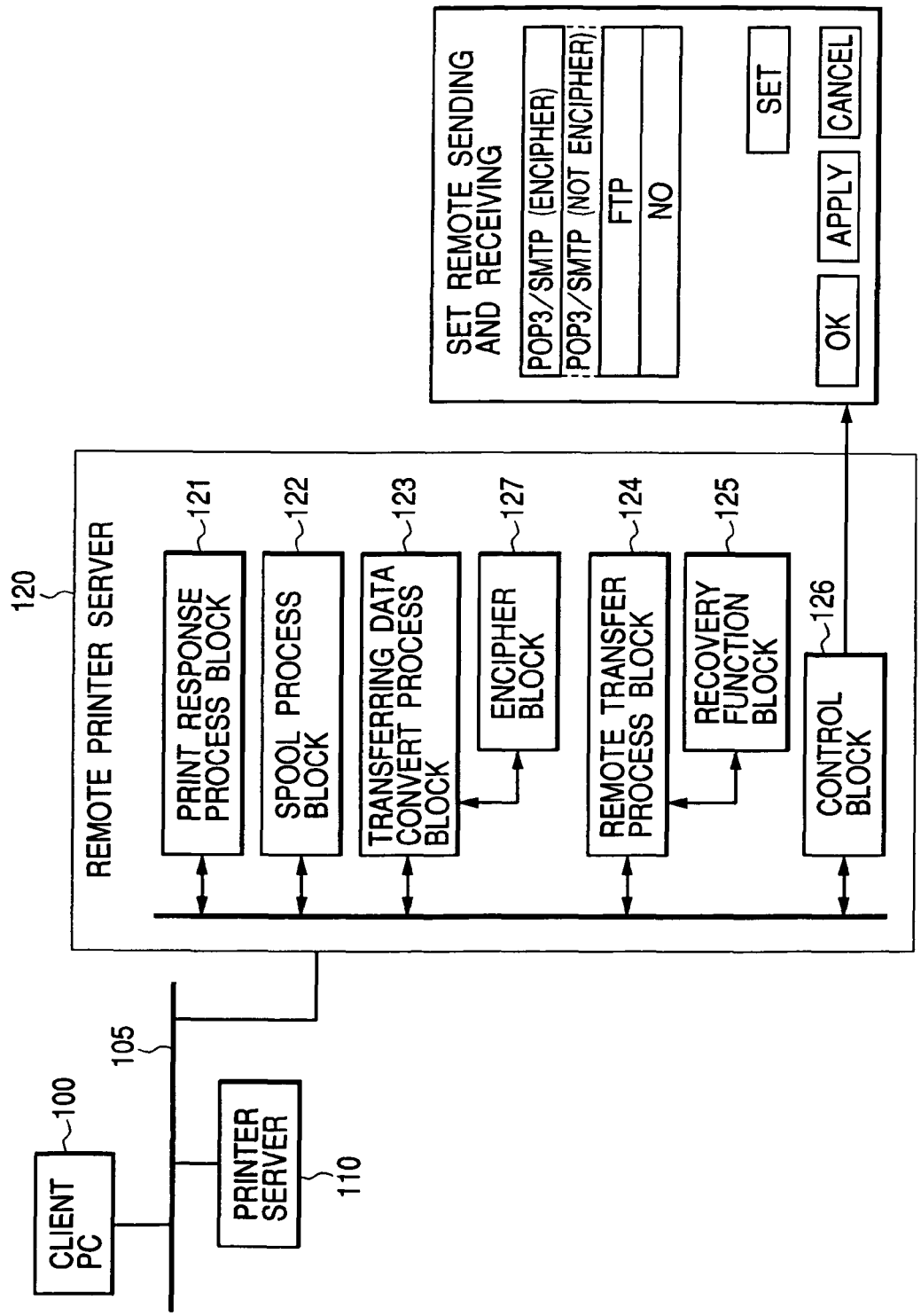
FIG. 1 is a block diagram showing the outline of the configuration of the remote printing system.

FIG. 1 shows the outline of the configuration of the remote printing system according to the present embodiment.

In FIG. 1, the client PC (personal computer) 100, the printer server 110, and the remote printing server 120 according to the present embodiment are connected to the local network 105.

The remote printing server 120 is configured by seven function blocks. They are a print response process block 121, a spool process block 122, a transferring data convert process block 123, an encipher block 127, a remote transfer process block 124, and a recovery function block 125 as independent modules.

These function blocks 121 to 127 are controlled by a control block 126. The control block 126 also controls the user interface screen for setting remote sending and receiving.

In the present embodiment, the color print data from the client PC 100 can be printed by the printer server 110. Similarly, when the remote printing server 120 is viewed from the client PC 100, it can be recognized as a network printer as with the printer server 110.

This is because the print control protocol is executed such that the remote printing server 120 can be recognized as the printer on the network 105. The protocol is processed by the internal print response process block 121.

When the client PC 100 outputs an instruction to print for the remote printing server 120, the session start process starts as in the normal print process, and a series of communications including a print start command, sending and receiving a print status response, sending print data, a check of sending status, a print end command, session completion, etc. is performed in accordance with a predetermined print protocol.

When print data is sent to the remote printing server 120, the remote printing server 120 performs a data hold process in the spool process block 122 to internally hold the data. Data can be appropriately held in the spooling area of the disk device on the first remote printing server 120.

The data held in the spooling area is temporarily stored until the remote transfer is completed. According to the present embodiment, a mail sending and receiving protocol and a file transfer protocol are used for the remote transfer (hereinafter referred to as an FTP).

When the mail sending and receiving protocol is selected, spooled data group is encoded into 7-bit characters by the transferring data convert process block 123, a header file, etc. is added thereto, and is converted into a mail data format.

When a mail sending and receiving protocol is selected, and if "POP/SMTP (no encipher process)" is selected from UI (user interface), sending is performed in the mail data format in which the encode process, etc. is performed.

When "POP/SMTP (no encipher process)" is selected from the UI, the encipher process is further performed on the encoded mail format, thereby generating and sending enciphered mail data.

In the remote transfer process block 124, the converted data is appropriately sent over a network 105. When the FTP is selected for the remote transfer, the data is not converted, and the spooled data is transferred in binary directly to the receiving server. At the remote transfer, the recovery function block 125 is called as necessary, data is re-sent, etc., thereby sending data without fail.

Figure 2:
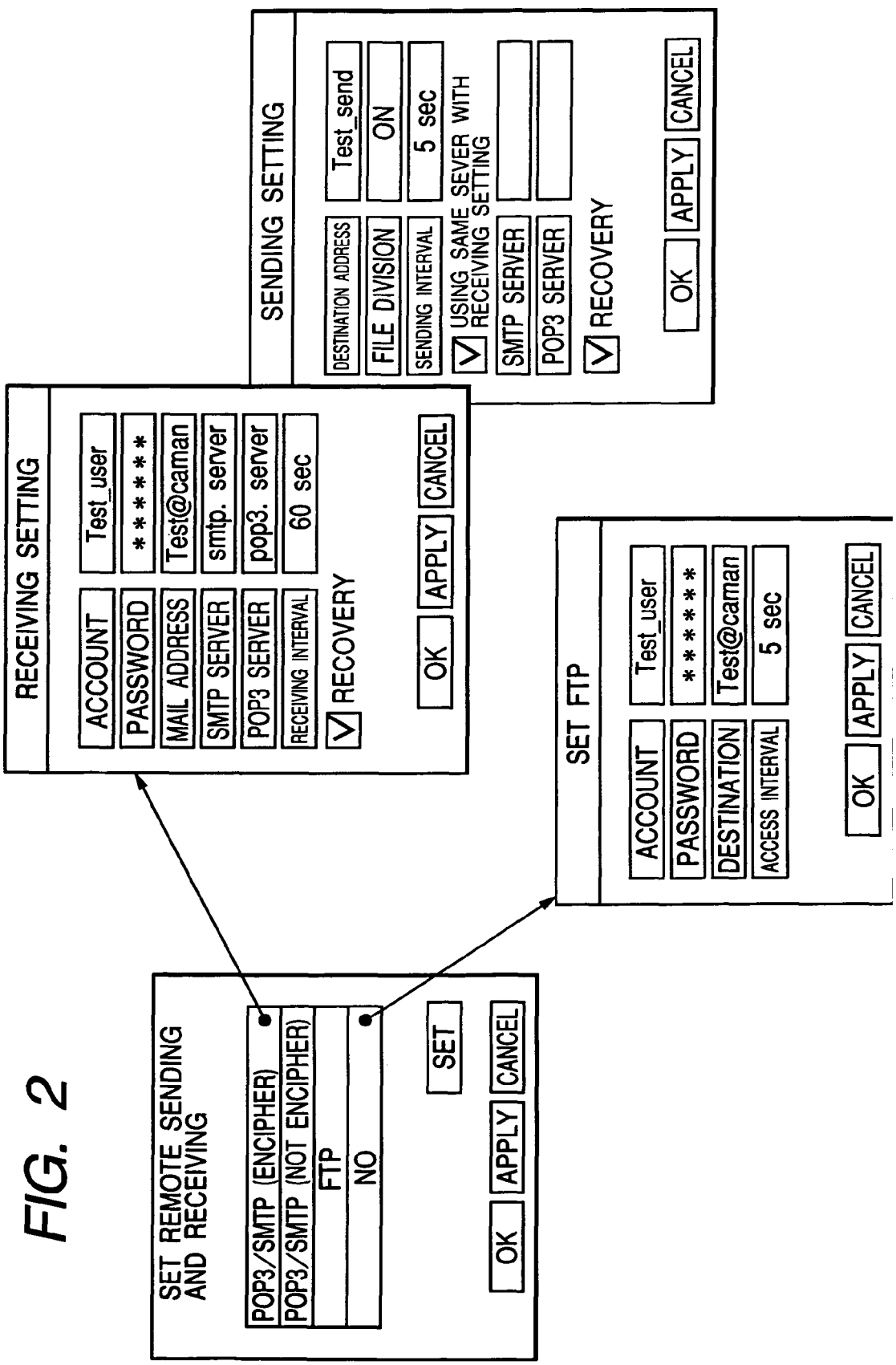
FIG. 2 shows a part of the user interface used in the remote printing server.

FIG. 2 shows a part of the user interface for use in the remote printing server according to the present embodiment. In the user interface, receiving setting, sending setting, and FTP setting are performed.

In the receiving setting, a mail account, a password, a mail address, an SMTP server, a POP3 server, and receiving interval are set. When the recovery process is performed, the recovery check box is to be checked.

In the sending setting, a destination mail address, ON/OFF of the file division process, and a sending interval are set. When the server of the SMTP/POP3 used at sending is the same as that set in the receiving setting, the "Using same server with receiving setting" is to be checked.

When the recovery process is performed during the send process as in the receive process, the recovery check box is to be checked. When the sending remote printing server is set for sending, the "recovery" is to be checked.

When the "recovery" is not checked when the receiving remote printing server is set for receiving, the recovery process is nullified. Therefore, to set the recovery, the "recovery" is to be checked for sending and receiving. In the FTP setting, an account, a password, a destination host name (or an IP address), an access interval, etc. are set.

Figure 3:
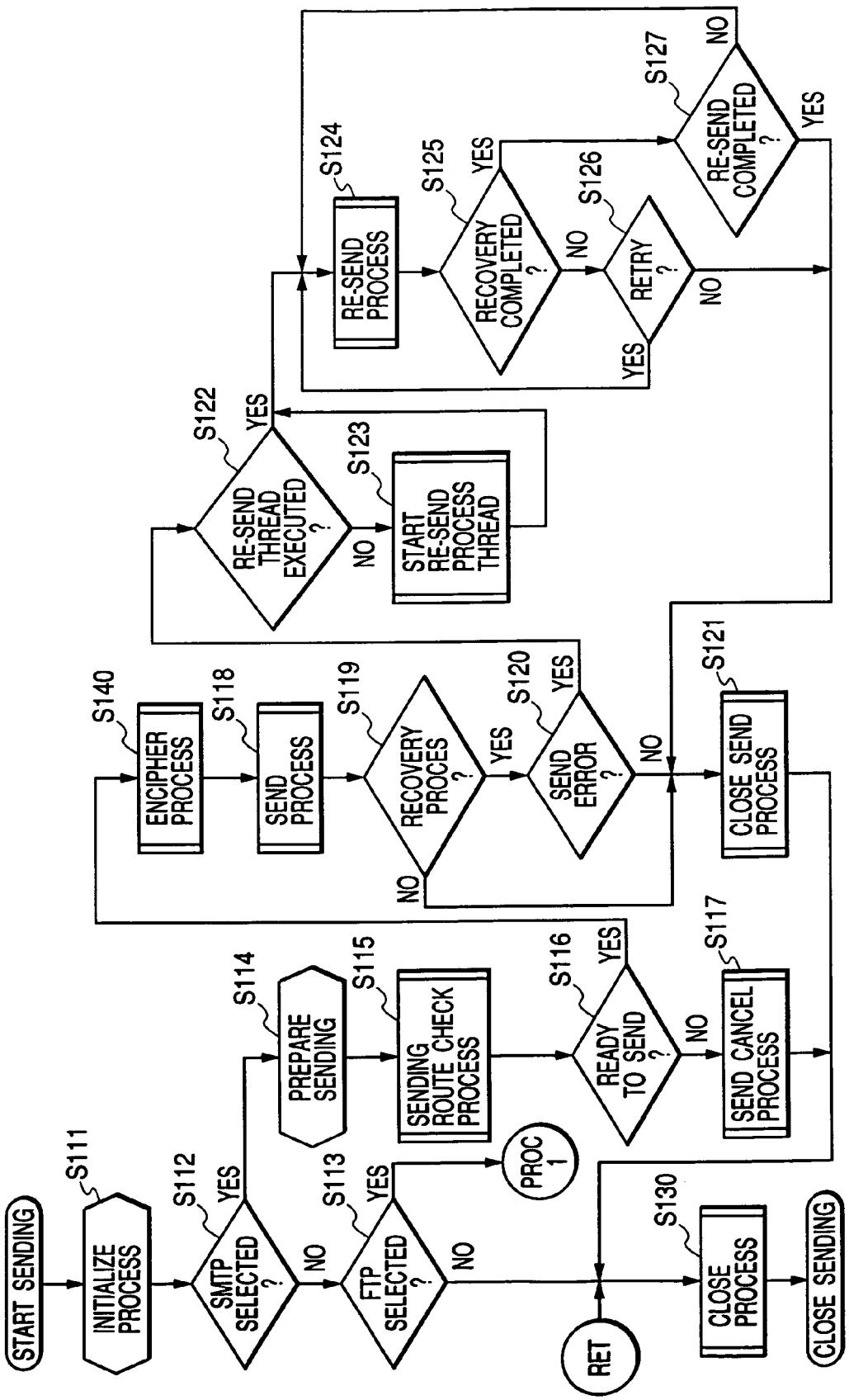
FIG. 3 is a rough flowchart for explanation of the processing procedure at sending.

FIG. 3 is a flowchart for explanation of the outline of the processing procedure at sending according to the present embodiment.

As shown in FIG. 3, when the process starts, the initialize process is first performed for sending in step S111.

In step S112, it is determined whether or not the SMTP is to be used for remote transfer.

The processes can be switched by the remote sending and receiving setting unit of the user interface. In setting the remote sending and receiving, "POP3/SMTP", "FTP", or "None" can be selected.

Figure 5:
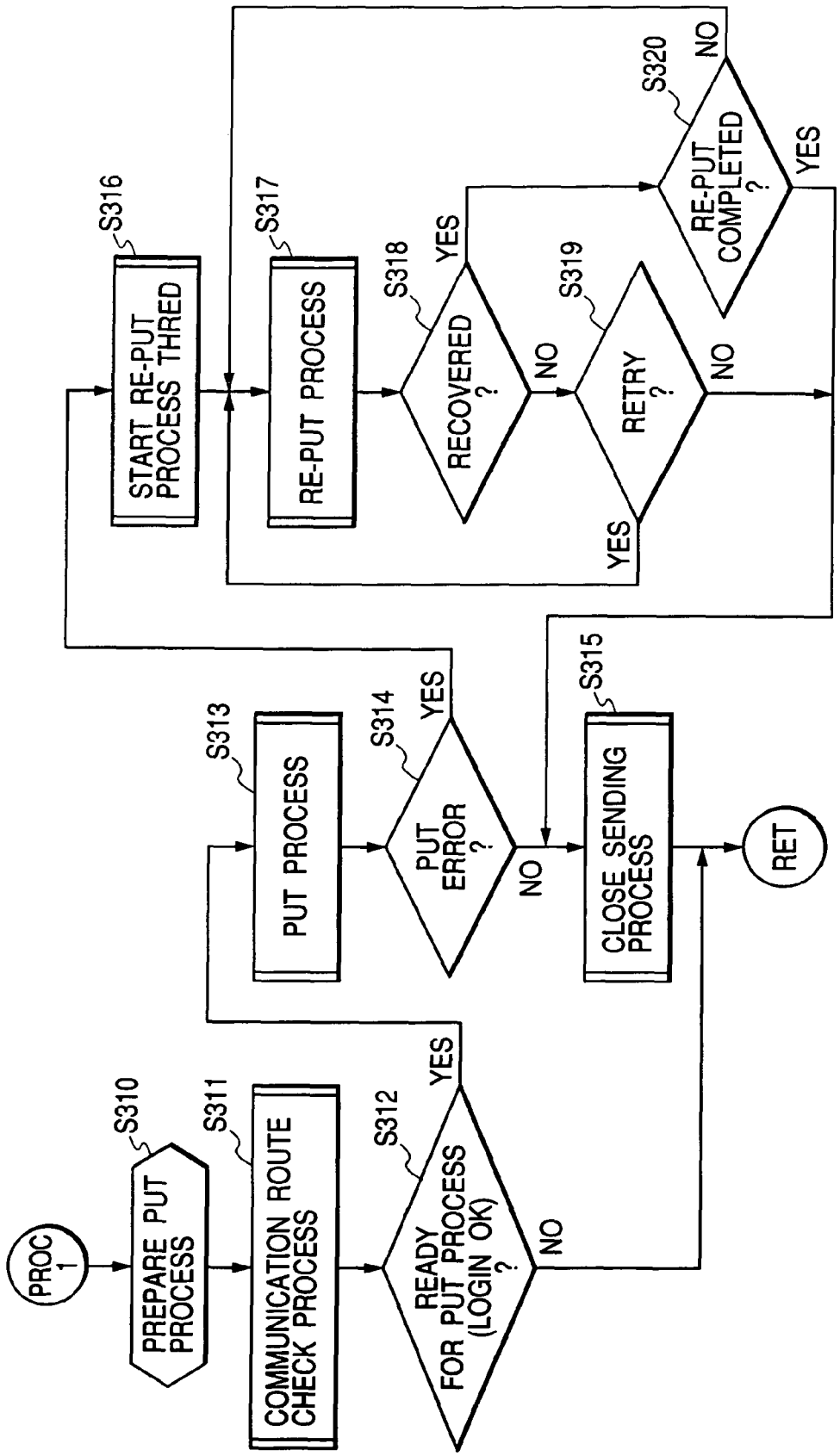
FIG. 5 is a rough flowchart for explanation of the processing procedure at FTP transfer.

When the "FTP" is selected in step S112, control is passed from step S113 to and after the head step S310 shown in the flowchart in FIG. 5. When "None" is selected, control is passed to step S130, thereby terminating the send process.

In step S112, when "POP3/SMTP" is selected, control is passed to and after step S114. In step S114, the preparation for sending is started. Then, control is passed to step S115, and the process of checking a sending path is performed. This is the process of checking the function of a mail sever by a checking protocol, asking whether or not the destination server is ready for receiving using checking mail, etc., and confirming the status of the entire path before starting the send process.

Then, control is passed to step S116, and it is determined whether or not it is ready for sending based on the result of the process in step S115. If the sending is disabled as a result of the check process, then control is passed to step S117, the send process is canceled, and the current process terminates.

If it is ready for sending as a result of the determination in step S116, then control is passed to step S140, and the send process is started. In the present embodiment, data is enciphered in step S140. In step S118, the data held by the spooler is appropriately converted into a mail format, and the data group is sent.

Then, in step S119, it is determined whether or not the recovery process is to be performed. The processes can be switched by "recovery" of the sending setting of the user interface. If a set item is not checked, control is passed to step S121, and the send process terminates. If a set item is checked, then control is passed to and after step S120.

In step S120, it is checked whether or not any system error has occurred as a result of the process in step S118. If there is no error as a result of the check, control is passed to step S121, and the send process terminated. If any error has occurred, control is passed to and after step S122, and the recovery process is performed.

In step S122, it is determined whether or not the re-send process has already been performed. If the re-send process thread has not been performed yet, then control is passed to step S123, a receiving thread is started, and control is passed to step S124.

If it is determined in step S122 that the re-send process thread has been performed, control is passed to step S124.

In step S124, the re-send process is appropriately performed. In the re-send process, the response mail of the receiving server is observed, and only the lacking information is re-sent as necessary.

As a result of a series of processes, it is determined in step S125 whether or not the recovery process has been appropriately performed. If the recovery process has been performed, control is passed to step S127, and it is determined whether or not the re-send process has been completed. If it is determined in step S127 that the re-send process has not been completed, then control is returned to step S124, the re-send process is repeatedly performed. If the re-send process has been completed, control is returned to step S121, and the send process terminates.

If it is determined in step S125 that the recovery process cannot be performed, then control is passed to step S126, and it is determined whether or not a retry process is to be performed based on the internal parameters such as the number of retry times, a timeout value, etc.

If it is determined in step S126 that the retry process is required, then control is returned to step S124, and the re-send process is repeated again. If it is determined that the retry process is not required, then control is returned to step S121, and the send process is terminated.

Figure 4:
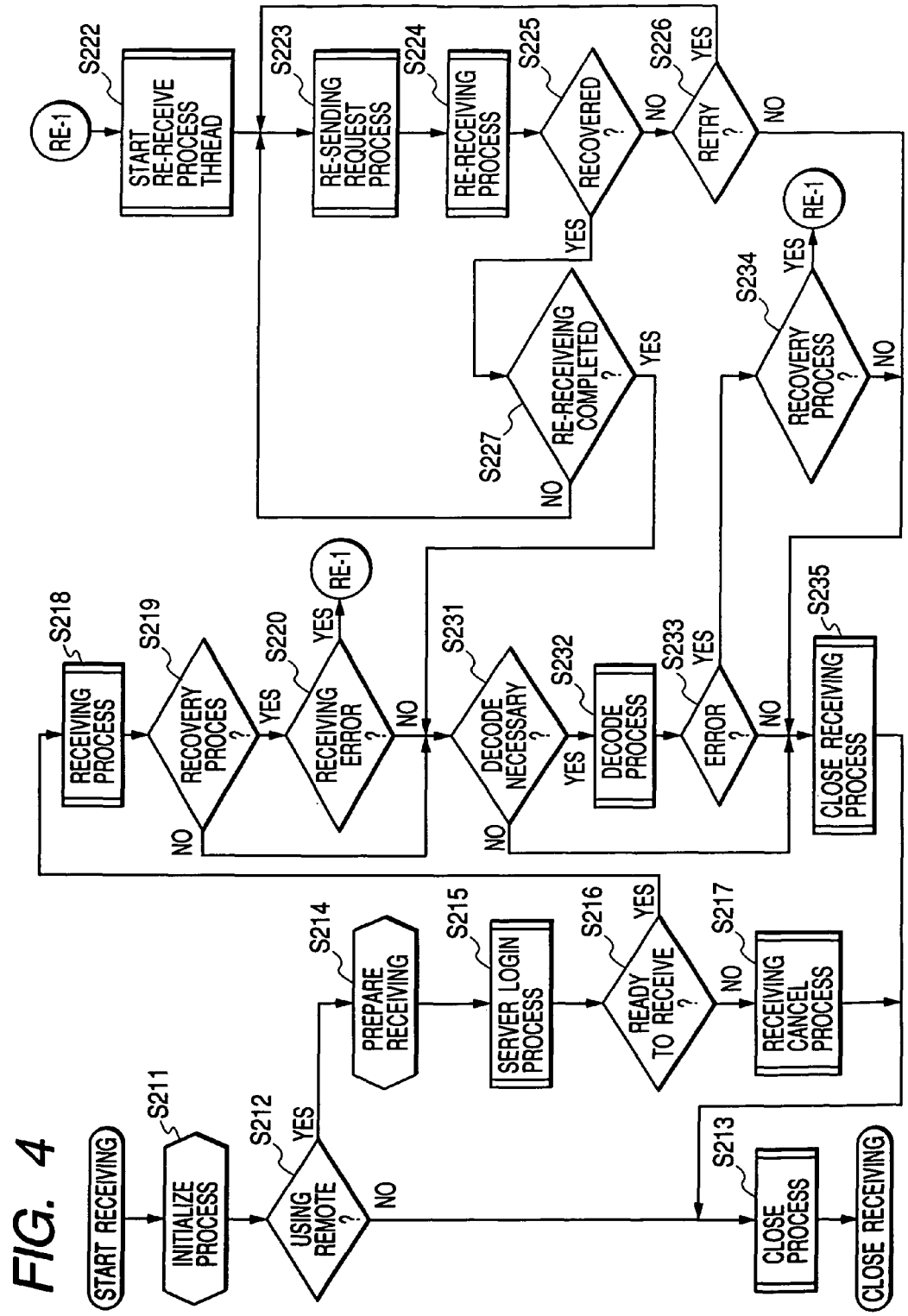
FIG. 4 is a rough flowchart for explanation of the processing procedure at receiving.

FIG. 4 is a flowchart for explanation of the outline of the processing procedure at receiving according to the present embodiment.

When the receive process starts, the initialize process is first performed in step S211 for receiving.

Then, in step S212, it is determined whether or not the remote setting is to be used. The processes can be switched by the remote sending and receiving setting unit of the user interface. In setting the remote sending and receiving, "POP3/SMTP" or "None" can be selected. If "None" is selected as a result of the determination, control is passed to step S213, and the process terminates. If "POP3/SMTP" is selected as a result of the determination in step S212, control is passed to and after step S214.

In step S214, the preparation for receiving is started. In step S215, the receiving server is logged in. In step S216, it is determined whether or not receiving is enabled based on the determination in step S215. If the receiving is disabled as a result of the check, then control is passed to step S217, the receive process is canceled, and the process terminated.

If the receiving is enabled as a result of the determination in step S216, then control is passed to and after step S218, and the receive process is started. In step S218, data is appropriately re-generated using a mail group obtained in the POP process.

Then, in step S219, it is determined whether or not the recovery process is to be performed. The processes can be switched by "recovery" of the receiving setting of the user interface. If a set item is not checked, control is passed to step S231.

If a set item is checked, then control is passed to and after step S220. In step S220, it is checked whether or not any system error has been reported as a result of the process in step S218. If there is no error as a result of the determination, control is passed to step S231. If there is any error, control is passed to and after step S222, and the recovery process is performed.

In step S222, the receiving thread is started, and control is passed to step S223. In step S223, the re-send request process is appropriately performed. In this process, a response mail is sent to the sending server. Information such as a lacking portion, etc. in generating data is described in the mail.

Then, in step S224, the re-receive process is appropriately performed. In step S225, it is determined based on the result of the re-receive process in step S224 whether or not the recovery process has been successfully performed. If the recovery process has been performed, control is passed to step S227, and it is determined whether or not the re-receive process has been completed.

If it is determined in step S227 that the re-receive process has not been completed, then control is returned to step S223, the re-receive process is repeatedly performed. If the re-receive process has been completed, control is returned to step S231.

If it is determined in step S225 that the recovery process cannot be performed, then control is passed to step S226, and it is determined whether or not a retry process is to be performed based on the internal parameters such as the number of retry times, a timeout value, etc.

If it is determined in step S226 that the retry process is required, then control is returned to step S223, and the re-receive process is repeated again. If it is determined that the retry process is not required, then control is returned to step S235, and the re-receive process is terminated.

If there is no reception error as a result of the determination in step S220, then control is passed to step S231. In step S231, it is determined whether or not data that has completed reception is enciphered. If data is not enciphered as a result of the determination, control is passed to step S235. If the data is enciphered, control is passed to step S232. In step S232, the enciphered data is decoded.

When the decode process is completed in step S232, control is passed to step S233. In step S233, it is determined whether or not any error has occurred in the decode process. If an error has occurred, control is passed to step S234. If no error has occurred, control is passed to step S235. In step S234, it is determined whether or not the recovery process is to be performed.

As in the above-mentioned process in step S219, the recovery process can be switched by the "recovery" of the receiving setting of the user interface. If a set item is not checked, then control is passed to step S235. If a set item is checked, control is passed to and after step S222. In step S235, an appropriate data conversion, a transmitting operation, a simple release of used resources, etc., a received log recording operation, etc. are performed, thereby terminating the receive process.

FIG. 5 is a rough flowchart for explanation of the processing procedure at FTP transfer according to the present embodiment.

When the process is started, the preparation for the PUT process is performed first in step S310. Then, in step S311, a communications path is checked. According to the result of the check, it is determined in step S312 whether or not the PUT process can be performed. In the present embodiment, it is determined by the possibility of the login to the receiving server when the FTP is started.

In step S313, the PUT process is started. Then, in step S314, it is determined whether or not a PUT error has occurred based on the log data in the PUT process. If there is no error as a result of the determination, then control is passed to step S315, thereby terminating the send process.

If it is determined in step S314 that an error has occurred, control is passed to step S316, and the recovery process is performed. In step S316, a control thread is started to perform a re-PUT process.

Then, in step S317, the re-PUT process is performed. Then, in step S318, as in step S314, it is determined based on the log data (at re-PUT process) whether or not a PUT error has occurred. If no PUT error has occurred as a result of the determination, then it is determined that the recovery process has been successfully performed, and control is passed to step S320.

If it is determined in step S318 that an error has occurred, then it is determined that the recovery process has not been successfully performed, and control is passed to step S319. It is determined in step S320 whether or not all re-PUTs have been completed. If YES, control is passed to step S315, thereby terminating the send process.

If there are plural pieces of data to be sent, and there is any data whose re-PUT has not been completed, then control is returned to step S317 again, and the re-PUT process is performed. In step S319, the number of retry times permitted in the system is checked. If the number has not exceeded a threshold, then control is returned to step S317, and the re-PUT process is performed. If the number has exceeded the threshold, then the recovery process is stopped, control is returned to step S315, and the send process is terminated.

If the receiving server is set for remote sending and receiving, a hot folder process thread for periodically monitoring the FTP folder is started. If the folder displays data, and a predetermined time has passed, then an appropriate process is to be started.

Second Embodiment

The second embodiment of the color data processing apparatus according to the present invention is described below. The system of the second embodiment is substantially the same as that of the first embodiment. However, in the present embodiment, the encipher process can also be selected at FTP transfer. The detailed explanation of the present embodiment is given below by referring to FIGS. 6 and 7.

Figure 6:
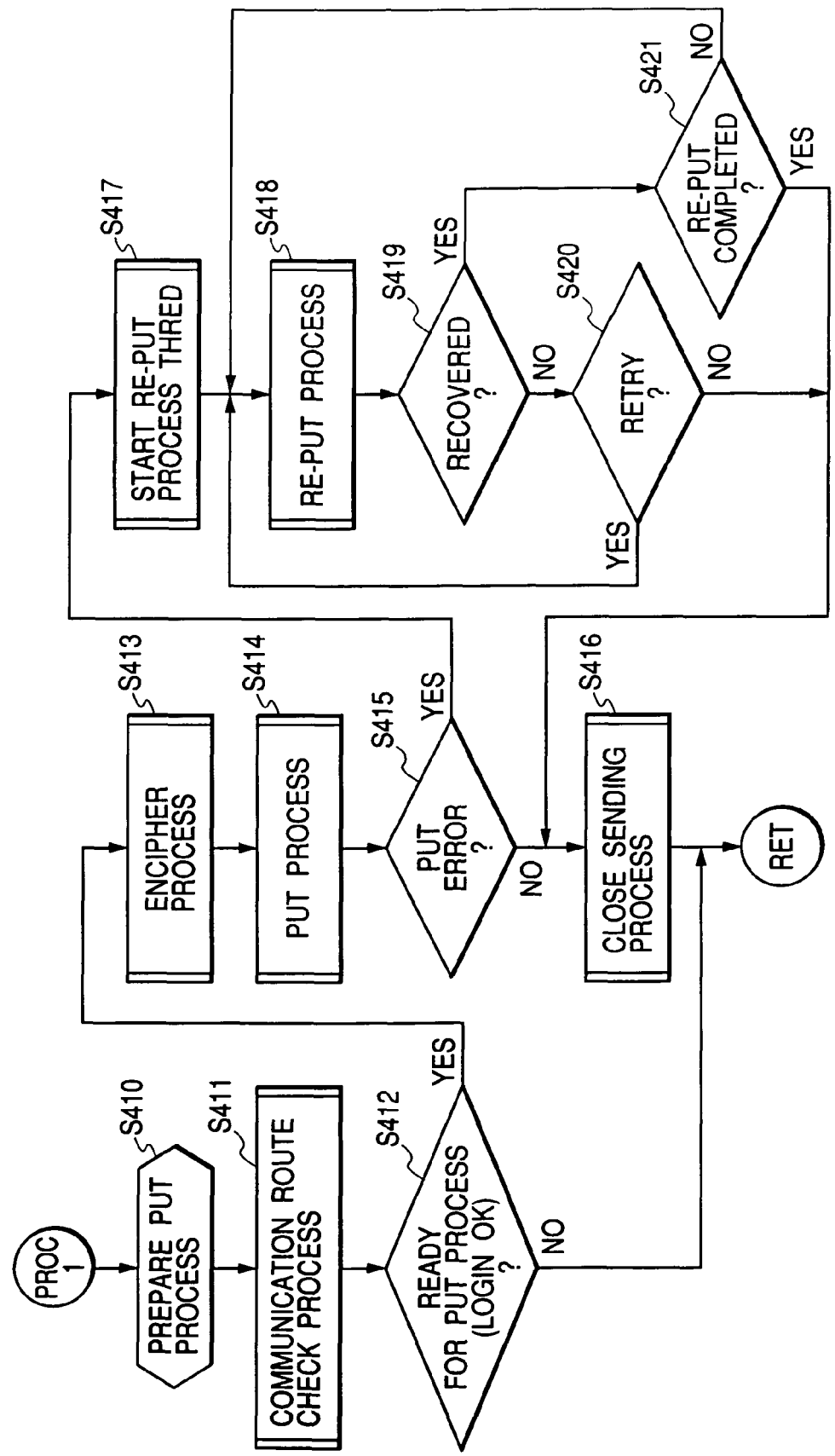
FIG. 6 is a rough flowchart for explanation of the processing procedure at FTP transfer.

FIG. 6 is a rough flowchart for explanation of the processing procedure at FTP transfer according to the present embodiment.

When the process is started as shown in FIG. 6, the preparation for the PUT process is performed first in step S410. Then, in step S411, a communications path is checked. According to the result of the check, it is determined in step S412 whether or not the PUT process can be performed. In the present embodiment, it is determined by the possibility of the login to the receiving server when the FTP is started. If the PUT process can be performed as a determination result, control is passed to step S413, and the encipher process is performed on the data to be transferred.

Then, in step S414, the PUT process is started. Then, in step S415, it is determined whether or not a PUT error has occurred based on the log data in the PUT process.

If there is no error as a result of the determination, then control is passed to step S416, thereby terminating the send process. If it is determined that an error has occurred, control is passed to and after step S417, and the recovery process is performed.

In step S417, a control thread is started to perform a re-PUT process. Then, in step S418, the re-PUT process is performed. Then, in step S419, as in step S415, it is determined based on the log data (at re-PUT process) whether or not a PUT error has occurred.

If no PUT error has occurred as a result of the determination, then it is determined that the recovery process has been successfully performed, and control is passed to step S421. If it is determined that an error has occurred, then it is determined that the recovery process has not been successfully performed, and control is passed to step S420.

It is determined in step S421 whether or not all re-PUTs have been completed. If YES, control is passed to step S416, thereby terminating the send process. If there are plural pieces of data to be sent, and there is any data whose re-PUT has not been completed, then control is returned to step S418, and the re-PUT process is performed again.

In step S420, the number of retry times permitted in the system is checked. If the number has not exceeded a threshold, then control is returned to step S417, and the re-PUT process is performed. If the number has exceeded the threshold, then the recovery process is stopped, control is returned to step S416, and the send process is terminated.

Figure 7:
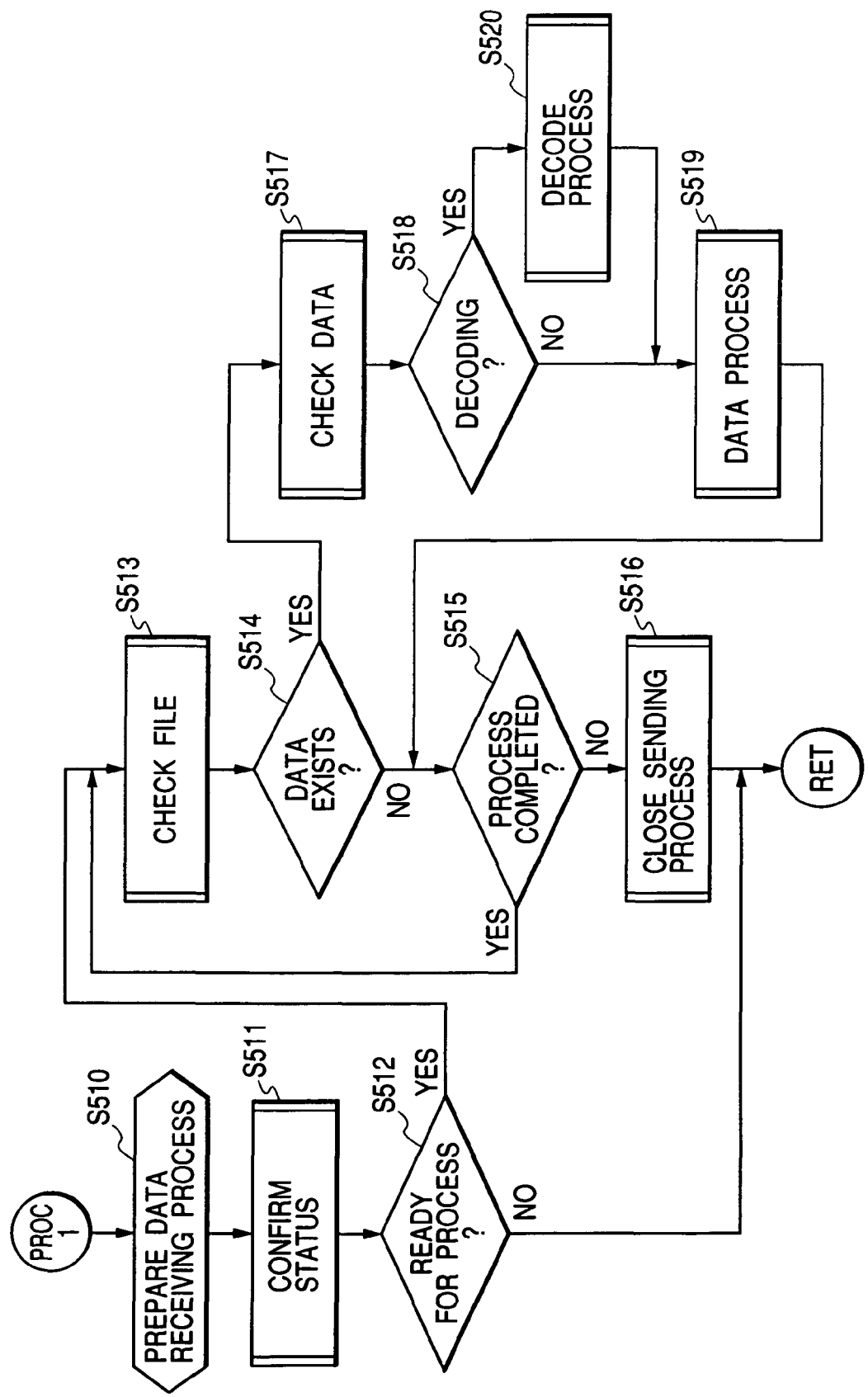
FIG. 7 is a flowchart for explanation of the outline of the processing procedure of FTP receiving server.

FIG. 7 is a flowchart for explanation of the outline of the processing procedure of FTP receiving server according to the present embodiment.

As shown in FIG. 7, when the process is started, the preparation for receiving data is performed first in step S510. Then, in step S511, the status of the receiving folder of the receiving server is checked, and it is determined in step S512 based on the check result whether or not the receive process can be performed.

If the receive process can be performed as a result of the determination, then control is passed to step S513, and it is checked whether or not a new file has been generated. In this check, if data is displayed on the folder, and a predetermined time has passed, then a new file is recognized.

Then, in step S514, it is determined whether or not there is a new file based on the result of the process in step S513. If a new file is detected as a result of the determination, then it is determined that a file has been transferred from the source through the FTP, and control is passed to and after step S517.

If there is no new file as a result of the determination in step S514, then control is passed to step S515. In step S515, it is determined whether or not the process is to be terminated. The condition of terminating the process can be the number of loop times, an elapsed time, an external signal, etc. Depending on the situation, control is appropriately passed to step S513 or S516.

In step S517, a new file is loaded to check internal data. Then, in step S518, it is determined whether or not data has been enciphered. If it is necessary to decode data, the decode process is performed in step S520. If it is not necessary to decode data, control is passed to step S519. In step S519, data is taken over, and control is passed to step S515.

Thus, the receiving server confirms the status of the FTP folder (receiving folder), thereby appropriately starting the process when data is displayed on the folder.

Third Embodiment

In the above-mentioned embodiment, a encipher block is not required. Additionally, the transfer protocol is not limited to an FTP.

Figure 8:
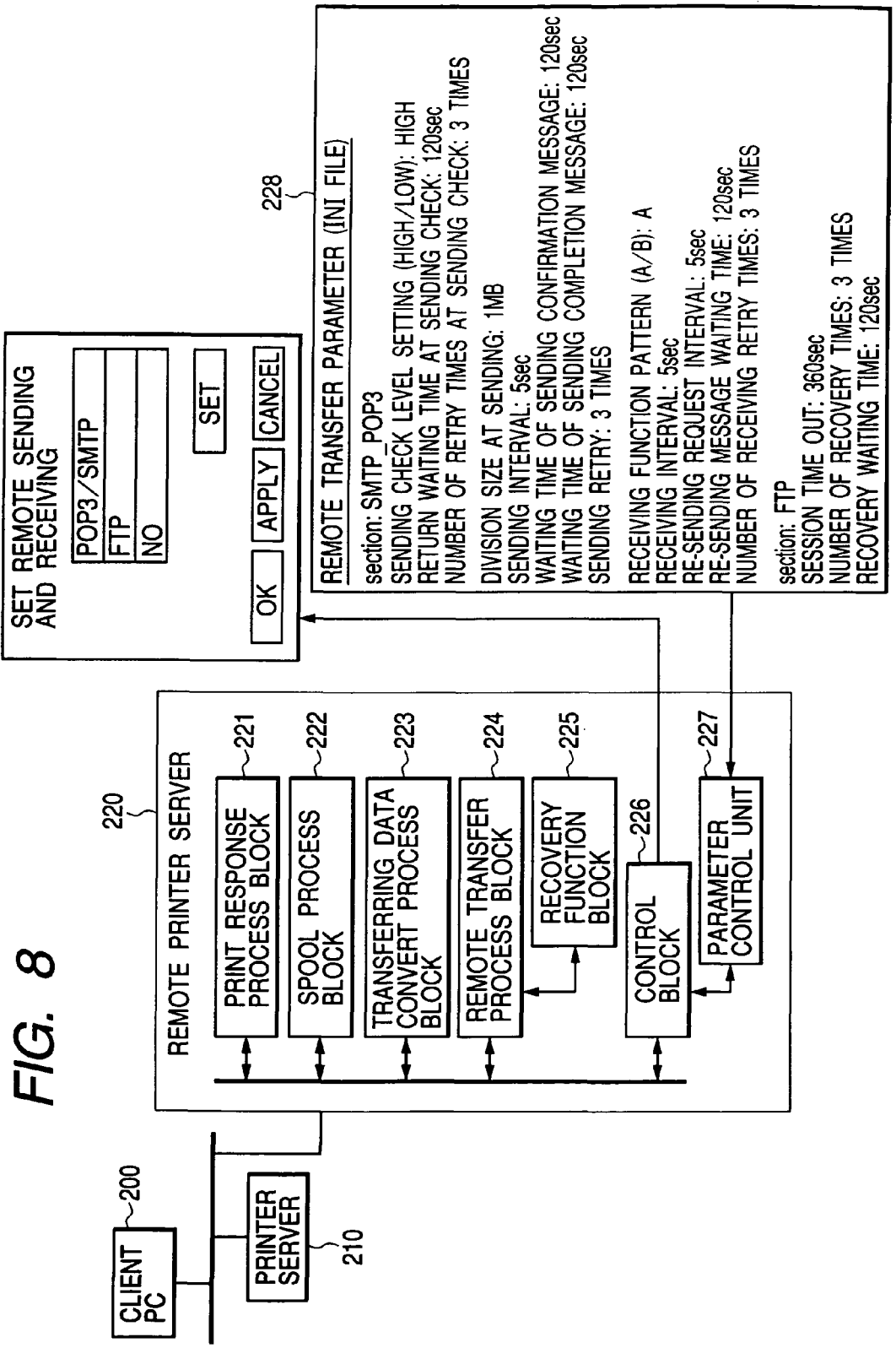
FIG. 8 is a block diagram showing the outline of the configuration according to the third embodiment of the present invention.

FIG. 8 is a block diagram showing the outline of the configuration of the remote printing system according to the third embodiment of the present invention. The configuration is substantially the same as that according to the first embodiment, but does not include an encipher block, thereby possibly setting a remote transfer parameter.

In FIG. 8, a client PC 200, a printer server 210, and a remote printing server 220 according to the present invention are connected to the network.

The remote printing server 220 is configured by six function blocks. They are a print response process block 221, a spool process block 222, a transferring data convert process block 223, a remote transfer process block 224, and a recovery function block 225 as independent modules. They are controlled by a control block 226 for controlling a series of controlling operations.

The control block 226 also controls the user interface screen for setting remote sending and receiving. Furthermore, the control block 226 is connected to a parameter control unit 227 for setting a remote transfer parameter, etc. for use in the remote printing system according to the present embodiment.

The parameter control unit 227 retrieves a file 228 referred to as an INI file in which a remote transfer parameter is described from a predetermined place, appropriately loads it, and passes it to a control block. In the present embodiment, color print data from the client PC 200 can be printed on the printer server 210. Similarly, when the remote printing server 220 is viewed from the client PC 200, it is recognized as a network printer like the printer server 210.

This is because the print control protocol is executed such that the remote printing server 220 can be recognized as a printer on the network. The process of the protocol is realized by the internal print response process block 221.

That is, when the client computer 200 performs the print process for the remote printing server 220, the session start process starts as in the normal print process, and a series of communications including a print start command, sending and receiving a print status response, sending print data, a check of sending status, a print end command, session completion, etc. is performed in accordance with a predetermined print protocol.

When print data is sent to the remote printing server 220, the server performs a data hold process in the spool process block 222 to internally hold the data. Data can be appropriately held in the spooling area of the disk device on the server.

The held data is temporarily held until the remote transfer is completed. In the present embodiment, a mail sending and receiving protocol and a file transfer protocol (hereinafter referred to as an FTP) are used for remote transfer.

When the mail sending and receiving protocol is selected, spooled data group is encoded into 7-bit characters by the transferring data convert process block 223, a header file, etc. is added thereto, and the data is converted into a mail data format.

In the remote transfer process block 224, the converted data is appropriately sent over a network. When the FTP is selected for the remote transfer, the data is not converted, and the spooled data is transferred in binary directly to the receiving server. The recovery function block 225 is called as necessary at remote transfer, data is sent, etc. again so that the data can be sent without fail.

A parameter for prescription of the operation of a system is described as a remote transfer parameter (INI file) in the file 228. The contents are described in each session by remote transfer protocol. For the SMTP, and POP3, level setting (high and low) at sending check, a return waiting time at sending check, the number of retry times at sending check, a division size at sending, a sending interval, a waiting time of a sending confirmation message, a waiting time of a sending completion message, the number of sending retry times, receiving operation pattern (A/B), a receiving interval, a re-sending request interval, a waiting time of a re-sending message, the number of reception retry times, etc. can be set.

Furthermore, for the FTP, the value of a session time out, the number of recovery times, a recovery waiting time, etc. can be set.

In the level setting at sending check, a more strict check is made when a high level is set. When remote sending is started, an SMTP server check, an issue of a check mail, a status response wait of a receiving server, status mail confirmation, etc., are considered, and all items are processed. On the other hand, when the setting level is low, only the check of the SMTP server is made in the check process.

The return waiting time at sending check prescribes the waiting time until status mail is returned after an issue of check mail. When the waiting time is exceeded, a time out is determined, and check mail is issued again. The number of retry times at sending check is a value for permission of the number of time out process times. When a predetermined number of times is exceeded, the send process is canceled.

The division size at sending prescribes the data size for sending. When the data size is exceeded, a file divide process is performed. For example, when the division size is set to 1 MB, the data of 0.5 MB is sent as is. However, when the data of 4.5 MB is sent, the data is divided into five pieces of data for sending. A sending interval prescribes the interval of sending divided data.

The waiting time of a sending confirmation message prescribes a waiting time until receiving, confirmation notification mail is returned from a receiving server after a division message is sent. The waiting time of a sending completion message prescribes a waiting time until completion confirmation notification mail is returned from a receiving server after the last message is sent.

The waiting times are defined as time out if a prescribed times are exceeded, and a recovery process is performed. The number of sending retry times prescribes the number of recovery times. When the number of times is set to 0, no recovery process is performed.

The receiving interval prescribes an interval at which a POP operation, etc. is performed on the mail server. In the system according to the present embodiment, a re-sending request is issued when any error such as a failure in receiving mail, etc. occurs at receiving. However, when a plurality of errors occur, a re-sending request is issued each time an error occurs.

The issue interval is prescribed as a re-sending request interval. The waiting time of a re-sending message prescribes a waiting time until mail for recovery is re-sent from the sending server after a re-sending request is issued.

When the above-mentioned waiting time is exceeded, a time out is detected. The number of reception retry times prescribes the number of time out errors. When a set value is exceeded, the receive process is canceled.

The value of a session time out in the FTP is described as the maximum time which has elapsed from the start of the log in the FTP account. If the set time has elapsed even during the process, the entire process forcibly terminates including a network session. The number of recovery times prescribes the number of error recovery times in the in the PUT process. Furthermore, when the set time is exceeded, the entire process including the recovery process forcibly terminates.

The recovery waiting time prescribes a waiting time when a re-recovery operation is performed. When the PUT process is not completed, the next operation is not immediately performed, but the operation is temporarily stopped, and some time later, a re-PUT process is performed.

According to the above-mentioned embodiments, to send data over a network and print the data on a remote printer, a print job for performing a response process in printing data is generated, a print completion job is generated by spooling the generated print job, the generated print completion job is converted into a format in which it can be transferred to a remote printer over a network, a print completion job converted into a transferable format is transferred through a predetermined transfer protocol, and a print completion job to be transferred is enciphered in the remote transfer process.

Therefore, the print process for remote printing can be temporarily completed in a local network. Thus, the problems that a delay occurs in the communications established when remote printing is performed, and that inconvenience occurs when a connection is disconnected can be solved, and data can be easily and stably processed in remote printing. Furthermore, since a encipher process can be performed on a print completion job, print data can be prevented from being leaked during the remote transfer.

(Other Embodiments According to the Present Invention)

The present invention can be applied to a system comprising plural pieces of equipment, or to an apparatus comprising one piece of equipment.

Additionally, to realize the above-mentioned embodiments, various devices can be operated by providing a computer in an apparatus or a system connected to various devices with a program code of software for realization of the functions of the above-mentioned embodiments using a storage medium or a transmission medium such as the Internet, etc., an embodiment of operating various devices according to a program stored in the computer (CPU or MPU) of the system or the apparatus can be included in the scope of the present invention.

In this case, the functions of the above-mentioned embodiments are realized by the program code itself of the software, and the program code itself, means for providing the program code for the computer, for example, a storage medium storing the program code configures the present invention. A storage medium storing the program code can be, for example, a flexible disk, a hard disk, an optical disk, a magneto-optical disk, CD-ROM, a magnetic tape, a non-volatile memory card, ROM, etc.

Furthermore, not only the above-mentioned functions can be realized by a computer executing a provided program code according to the embodiments of the present invention, but also the functions according to the above-mentioned embodiments can be realized by combination use of the OS (operating system) operated in the computer by the program code and other application software, etc., wherein the program codes can be included in the embodiments of the present invention.

Additionally, after the provided program code is stored in the memory of a feature expansion board of the computer and a feature expansion unit connected to the computer, the CPU, etc. in the feature expansion board and the feature expansion unit can perform all or a part of the actual process at an instruction of the program code, and the above-mentioned embodiments are realized by the process, which is included in the present invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A remote printing server which receives data from a client computer via a local network and sends formatted data over a global network so as to print the formatted data on a remote printer which does not exist in the local network, comprising:

print response means for performing a print control protocol for a local printer in the local network so that the client computer can recognize said remote printing server as a local printer in the local network, receiving print data from the client computer and performing a print completion response to the client computer thereby completing a print process of the print data locally between the client computer and said remote printing server before the received print data is converted into a transferrable format and transferred to the remote printer;

spooling means for spooling the print data received by said print response means in a spooling area in said remote printing server;

transferring data conversion means for converting the print data spooled by said spooling means into the transferrable format in which the print data can be transferred to the remote printer over the global network using a predetermined transfer protocol; and remote transfer means for transferring the print data converted into the transferrable format by said transferring data conversion means to the remote printer over the global network using the predetermined transfer protocol.

2. The remote printing server according to claim 1, further comprising:
recovery means for performing a recovery process on the print completion job transferred by said remote transfer means as necessary.

3. The remote printing server according to claim 1, further comprising:
selection means for selecting a transfer protocol for remote transfer of the data.

4. The remote printing server according to claim 1, wherein said remote transfer means uses a file transfer protocol or a mail distribution protocol.

5. The remote printing server according to claim 1, further comprising:
encipher means for enciphering print completion job transferred by said remote transfer means.

6. The remote printing server according to claim 1, further comprising:
transfer control means for controlling a transfer parameter setting file and said remote transfer means by referring to the transfer parameter setting file.

7. A remote print system, comprising:
the remote printing server and the remote printer according to claim 1.

8. A data processing method performed by a remote printing server for receiving data from a client computer via a local network and for sending formatted data over a global network so as to print the formatted data on a remote printer which does not exist in the local network, comprising:
a print response step of performing a print control protocol for a local printer in the local network so that the client computer can recognize said remote printing server as a local printer in the local network, receiving print data from the client computer and performing a print completion response to the client computer thereby completing a print process of the print data locally between the client computer and said remote printing server before the received print data converted into a transferrable format and transferred to the remote printer;

a spooling step of spooling the print data received in said print response step in a spooling area in said remote printing server;

a transferring data conversion step of converting the print data spooled in said spooling step into the transferrable format in which the print data can be transferred to the remote printer over the global network using a predetermined transfer protocol; and a remote transfer step of transferring the print data converted into the transferrable format in said transferring data conversion step to the remote printer over the global network using the predetermined transfer protocol.

9. A non-transitory computer-readable storage medium storing a program used to direct a computer to use as a remote printing server for receiving data from a client computer via a local network and for sending formatted data over a global network so as to print the formatted data on a remote printer which does not exist in the local network, comprising:
a print response step of performing a print control protocol for a local printer in the local network so that the client computer can recognize said remote printing server as a local printer in the local network, receiving print data from the client computer and performing a print completion response to the client computer thereby completing a print process of the print data locally between the client computer and said remote printing server before the received print data is converted into a transferrable format and transferred to the remote printer;

a spooling step of spooling the, print data received in said print response step in a spooling area in said remote printing server;

a transferring data conversion step of converting the print data spooled in said spooling step into the transferrable format in which the print data can be transferred to the remote printer over the global network using a predetermined transfer protocol; and a remote transfer step of transferring the print data converted into the transferrable format in said transferring data conversion step to the remote printer over the global network using the predetermined transfer protocol.

* * * * *